(12) United States Patent
Baik et al.

(10) Patent No.: US 11,081,753 B2
(45) Date of Patent: Aug. 3, 2021

(54) RECHARGEABLE BATTERY

(71) Applicant: SAMSUNG SDI CO., LTD., Yongin-si (KR)

(72) Inventors: Yunki Baik, Yongin-si (KR); Seung Ho Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 300 days.

(21) Appl. No.: 16/263,312

(22) Filed: Jan. 31, 2019

(65) Prior Publication Data

US 2019/0280256 A1   Sep. 12, 2019

(30) Foreign Application Priority Data

Mar. 7, 2018 (KR) .................. 10-2018-0027023

(51) Int. Cl.
*H01M 2/04* (2006.01)
*H01M 2/20* (2006.01)
(Continued)

(52) U.S. Cl.
CPC .......... *H01M 50/169* (2021.01); *H01M 4/70* (2013.01); *H01M 10/0431* (2013.01); (Continued)

(58) Field of Classification Search
CPC ...... H01M 2/0426; H01M 2/202; H01M 2/26; H01M 2/263; H01M 2/30; H01M 2/34; H01M 4/70; H01M 10/0431; Y02E 60/10
See application file for complete search history.

(56) References Cited

U.S. PATENT DOCUMENTS

2009/0162741 A1   6/2009  Zheng et al.
2011/0305928 A1  12/2011  Kim et al.
(Continued)

FOREIGN PATENT DOCUMENTS

JP            5843815 B2    11/2015
KR   10-2011-0135805 A    12/2011
(Continued)

OTHER PUBLICATIONS

EPO Search Report dated May 22, 2019, for corresponding European Community Patent Application No. 19157981.2 (7 pages).

*Primary Examiner* — Brittany L Raymond
(74) *Attorney, Agent, or Firm* — Lewis Roca Rothgerber Christie LLP

(57) ABSTRACT

A rechargeable battery includes: an electrode assembly including an electrode including an uncoated region; a case configured to accommodate the electrode assembly and including an opening; a cap assembly including an electrode terminal and configured to be coupled to the opening to seal the case; and a current collecting plate configured to be coupled to the uncoated region of the electrode assembly, and the current collecting plate includes: a first flat plate portion including a welded portion welded to the uncoated region, a second flat plate portion including a fuse portion and electrically connected to the electrode terminal, and a vibration absorbing portion connected to the first and second flat plate portions of which opposite end portions face each other in a longitudinal direction, the vibration absorbing portion having a thickness that is thinner than thicknesses of the first and second flat plate portions.

9 Claims, 4 Drawing Sheets

(51) Int. Cl.
*H01M 2/26* (2006.01)
*H01M 2/30* (2006.01)
*H01M 2/34* (2006.01)
*H01M 4/70* (2006.01)
*H01M 10/04* (2006.01)
*H01M 50/169* (2021.01)
*H01M 50/502* (2021.01)
*H01M 50/531* (2021.01)
*H01M 50/538* (2021.01)
*H01M 50/543* (2021.01)
*H01M 50/572* (2021.01)

(52) U.S. Cl.
CPC ....... *H01M 50/502* (2021.01); *H01M 50/531* (2021.01); *H01M 50/538* (2021.01); *H01M 50/543* (2021.01); *H01M 50/572* (2021.01)

(56) References Cited

U.S. PATENT DOCUMENTS

| | | | |
|---|---|---|---|
| 2013/0095372 A1* | 4/2013 | Kim | H01M 10/0431 429/178 |
| 2016/0164133 A1* | 6/2016 | Matsumoto | H01M 10/049 429/179 |
| 2016/0336581 A1* | 11/2016 | Kwak | H01M 2/34 |
| 2017/0279157 A1 | 9/2017 | Lee et al. | |
| 2019/0067670 A1* | 2/2019 | Enomoto | H01M 2/263 |

FOREIGN PATENT DOCUMENTS

| | | | |
|---|---|---|---|
| WO | WO 2017-148612 | * | 9/2017 |
| WO | WO 2018/012788 A1 | | 1/2018 |
| WO | WO 2018/212447 A1 | | 11/2018 |

* cited by examiner

RECHARGEABLE BATTERY

CROSS-REFERENCE TO RELATED APPLICATION

This application claims priority to and the benefit of Korean Patent Application No. 10-2018-0027023, filed on Mar. 7, 2018 in the Korean Intellectual Property Office, the entire content of which is incorporated herein by reference.

BACKGROUND

1. Field

Aspects of embodiments of the present invention relate to a rechargeable battery, and more particularly, to a rechargeable battery having a current collector plate for electrically connecting an electrode assembly and an electrode terminal.

2. Description of the Related Art

A rechargeable battery differs from a primary battery in that it can be repeatedly charged and discharged, while the latter is incapable of being recharged. A low-capacity rechargeable battery may be used in a portable electronic device, such as a mobile phone, a laptop computer, and a camcorder, and a large-capacity rechargeable battery is widely used as a power source for driving a motor of a hybrid vehicle and the like.

A high-power rechargeable battery using a non-aqueous electrolyte and having high energy density has been developed, and the high-power rechargeable battery may be configured to have large capacity by connecting a plurality of rechargeable batteries such that it can be used in an apparatus requiring a large amount of electric power, such as in a driving motor of an electric vehicle.

An electrode tab of the rechargeable battery may be connected to an electrode lead, a connecting member, a bus bar, or the like of an adjacent battery cell, and they may be connected using ultrasonic welding.

However, when vibration occurs during the ultrasonic welding, a welded part or other parts adjacent to the welded part may be easily damaged, such that a disconnection circuit or a short circuit may be caused.

The above information disclosed in this Background section is only for enhancement of understanding of the background of the invention, and, therefore, it may contain information that does not form the prior art that is already known in this country to a person of ordinary skill in the art.

SUMMARY

According to an aspect of embodiments of the present invention, a rechargeable battery that may minimize or reduce damage due to vibration caused by ultrasonic welding or the like is provided.

According to one or more exemplary embodiments of the present invention, a rechargeable battery includes: an electrode assembly comprising an electrode comprising an uncoated region; a case configured to accommodate the electrode assembly and comprising an opening; a cap assembly comprising an electrode terminal and configured to be coupled to the opening to seal the case; and a current collecting plate configured to be coupled to the uncoated region of the electrode assembly, and the current collecting plate comprises: a first flat plate portion comprising a welded portion welded to the uncoated region, a second flat plate portion comprising a fuse portion and electrically connected to the electrode terminal, and a vibration absorbing portion connected to the first and second flat plate portions of which opposite end portions face each other in a longitudinal direction, the vibration absorbing portion having a thickness that is thinner than thicknesses of the first and second flat plate portions.

The fuse portion may include a fuse having a width that is narrower than a width of the first flat plate portion.

The vibration absorbing portion may curvedly extend between the first flat plate portion and the second flat plate portion.

The welded portion may be ultrasonically welded to the uncoated region, and the first flat plate portion may comprise a jig hole for ultrasonic welding.

The first flat plate portion and the second flat plate portion may be arranged in a longitudinal direction parallel to the cap assembly, and may be arranged to have different heights with respect to the electrode assembly.

The electrode assembly may include a plurality of electrode assemblies including a first electrode assembly and a second electrode assembly, and the welded portion may include a pair of welded portions to be welded to corresponding uncoated regions of the first and second electrode assemblies.

The vibration absorbing portion may have a width corresponding to a width of the second flat plate portion, and the first flat plate portion may have a width that is wider than the width of the vibration absorbing portion, and opposite end portions of the first flat plate portion may protrude outward in a width direction relative to the vibration absorbing portion to form the pair of welded portions.

The first electrode assembly and the second electrode assembly may have a wound shape and may be stacked with their lateral surfaces facing each other, the uncoated region may be directed to the cap assembly, and the current collecting plate may be between the uncoated region and the cap assembly and may be welded to the respective uncoated regions of the first electrode assembly and the second electrode assembly that the pair of welded portions respectively face.

The rechargeable battery may further include an insulating plate arranged between the uncoated regions of the first electrode assembly and the second electrode assembly and between the electrode assembly and the current collecting plate.

According to an aspect of the rechargeable battery of one or more exemplary embodiments of the present invention, damage due to vibration generated at a current collecting plate welded to an uncoated region of the electrode assembly may be minimized or reduced.

DETAILED DESCRIPTION

DESCRIPTION OF SYMBOLS

Figure 1:
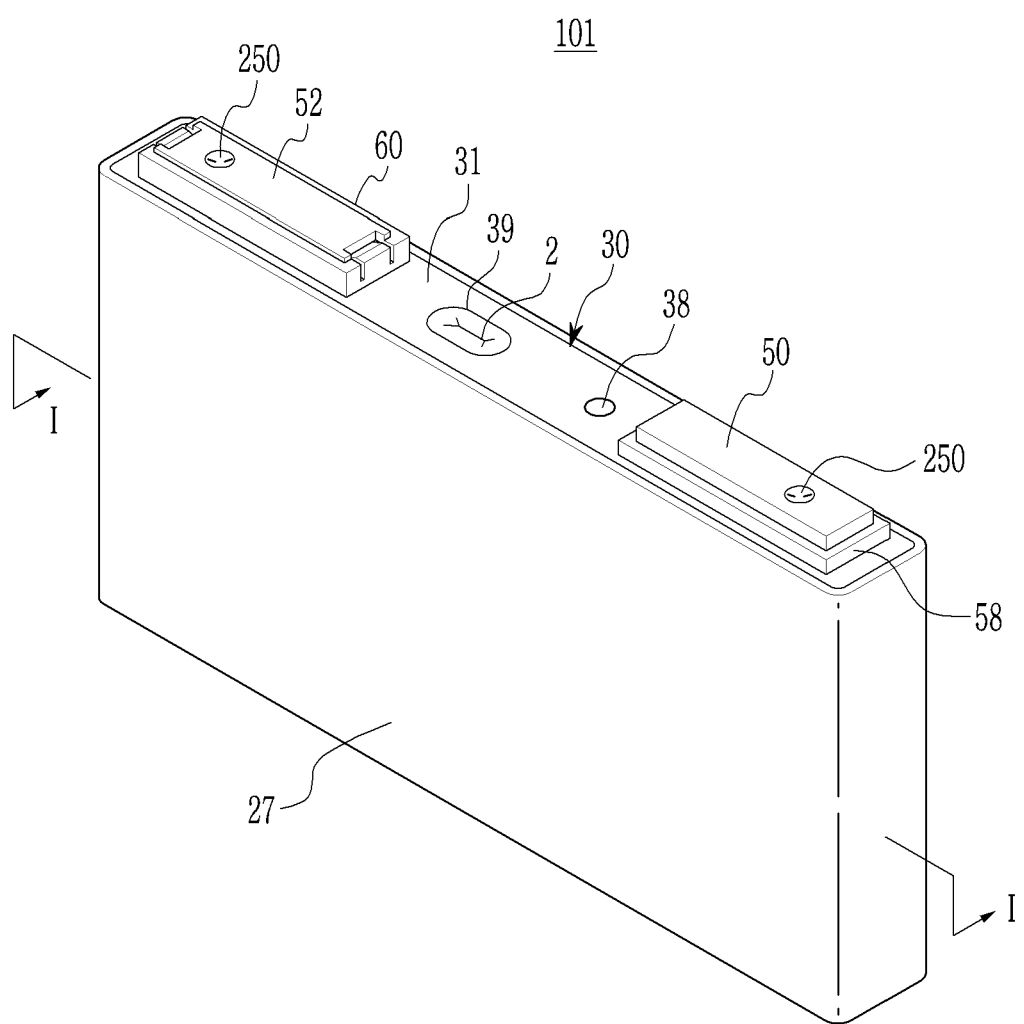
FIG. 1 illustrates a rechargeable battery according to an exemplary embodiment of the present invention.

| | |
|---|---|
| 3: shorting protrusion | 5: first connecting terminal hole |
| 9: second connecting terminal hole | 21b, 22b: uncoated region |
| 27: case | 30: cap assembly |
| 31: cap plate | 32: electrolyte injection hole |
| 34: vent hole | 37: shorting hole |
| 38: sealing cap | 39: vent plate |
| 50: first terminal | 52: second terminal |
| 56: shorting member | 58: connecting member |
| 59: sealing gasket | 60: first insulating member |
| 62: second insulating member | 64: insulating plate |
| 101: rechargeable battery | 120: electrode assembly |
| 130: insulating case | 250: connecting terminal |
| 300: current collecting plate | 342: second flat plate portion |
| 344: coupling hole | 362: first flat plate portion |
| 364: jig hole | 366: welded portion |
| 375: fuse portion | 377: fuse hole |
| 379: fuse | 380: vibration absorbing portion |

Herein, the present invention will be described more fully with reference to the accompanying drawings, in which some exemplary embodiments of the invention are shown.

As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In the present specification, a duplicated description for the same constituent elements may be omitted.

It is to be understood that, when it is described that an element is "coupled" or "connected" to another element, the element may be "directly coupled" or "directly connected" to the another element or "coupled" or "connected" to the another element through one or more third elements. In contrast, it should be understood that, when it is described that an element is "directly coupled" or "directly connected" to another element, no element is present between the element and the another element.

Terms used in the present specification are used to describe specific exemplary embodiments, and are not intended to limit the present invention.

Singular expressions used herein include plural expressions unless they have definitely opposite meanings in the context.

In the present specification, it should be understood that the term "include" indicates that a feature, a number, a step, an operation, a component, a part, or a combination thereof described in the specification is present, but does not exclude a possibility of presence or addition of one or more other features, numbers, steps, operations, components, parts, or combinations.

In the present specification, the term "and/or" includes any combination of the listed items or any of the listed items. In the present specification, "A or B" may include one of "A" and "B," or "both A and B."

It is to be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section described below could be termed a second element, component, region, layer, or section, without departing from the spirit and scope of the present invention.

Spatially relative terms, such as "lower," "upper," and the like, may be used herein for ease of explanation to describe one element or feature's relationship to another element(s) or feature(s) as illustrated in the figures. It is to be understood that the spatially relative terms are intended to encompass different orientations of the device in use or in operation, in addition to the orientation depicted in the figures. For example, if the device in the figures is turned over, elements described as being "lower" relative to other elements or features would then be oriented as "upper" relative to the other elements or features. Thus, the example terms "lower" and "upper" can encompass both an orientation of above and below. The device may be otherwise oriented (e.g., rotated 90 degrees or at other orientations) and the spatially relative descriptors used herein should be interpreted accordingly.

Unless otherwise defined, all terms (including technical and scientific terms) used herein have the same meaning as commonly understood by one of ordinary skill in the art to which the present invention belongs. It is to be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
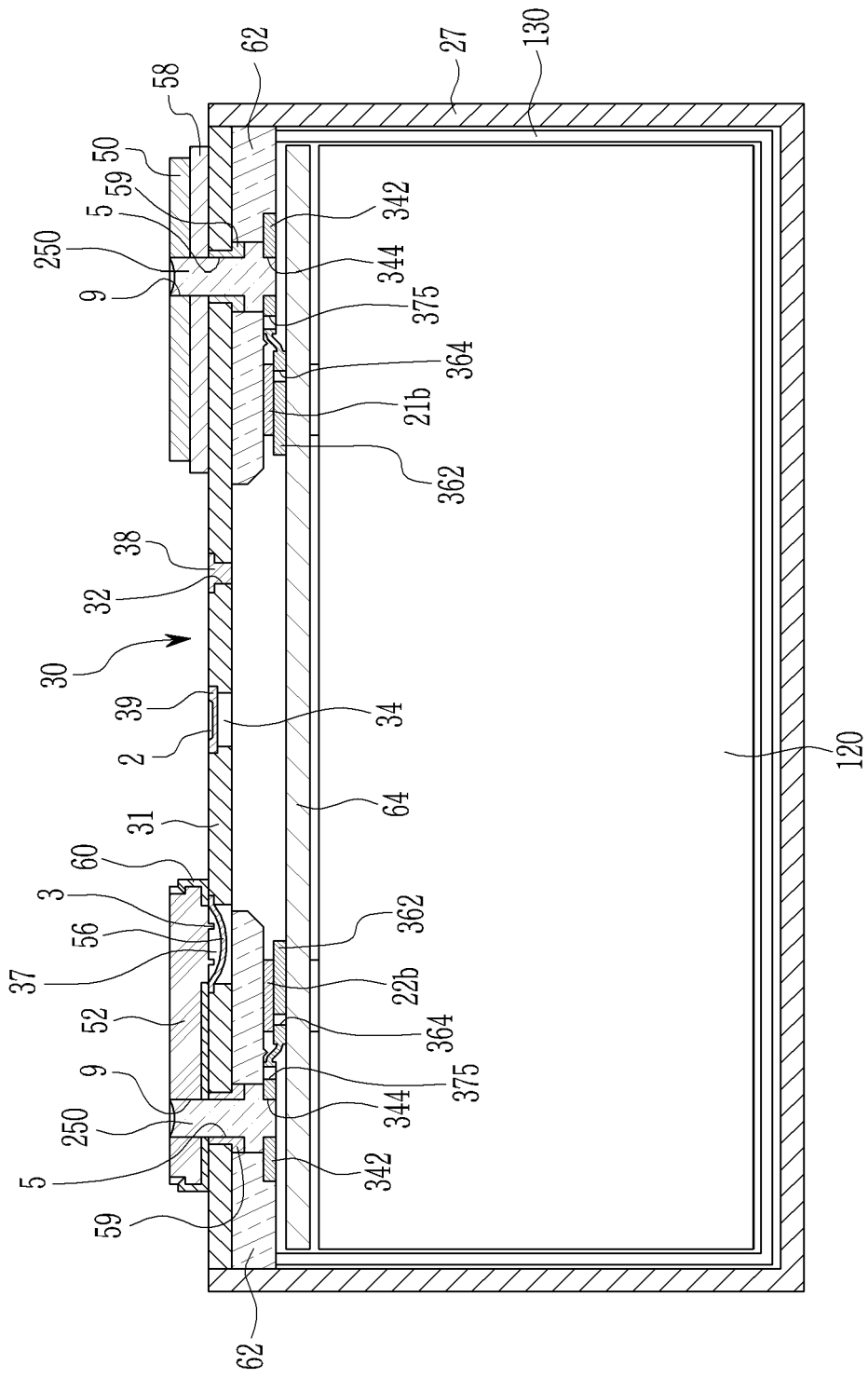
FIG. 2 illustrates a cross-sectional view taken along the line I-I of FIG. 1.
Figure 3:
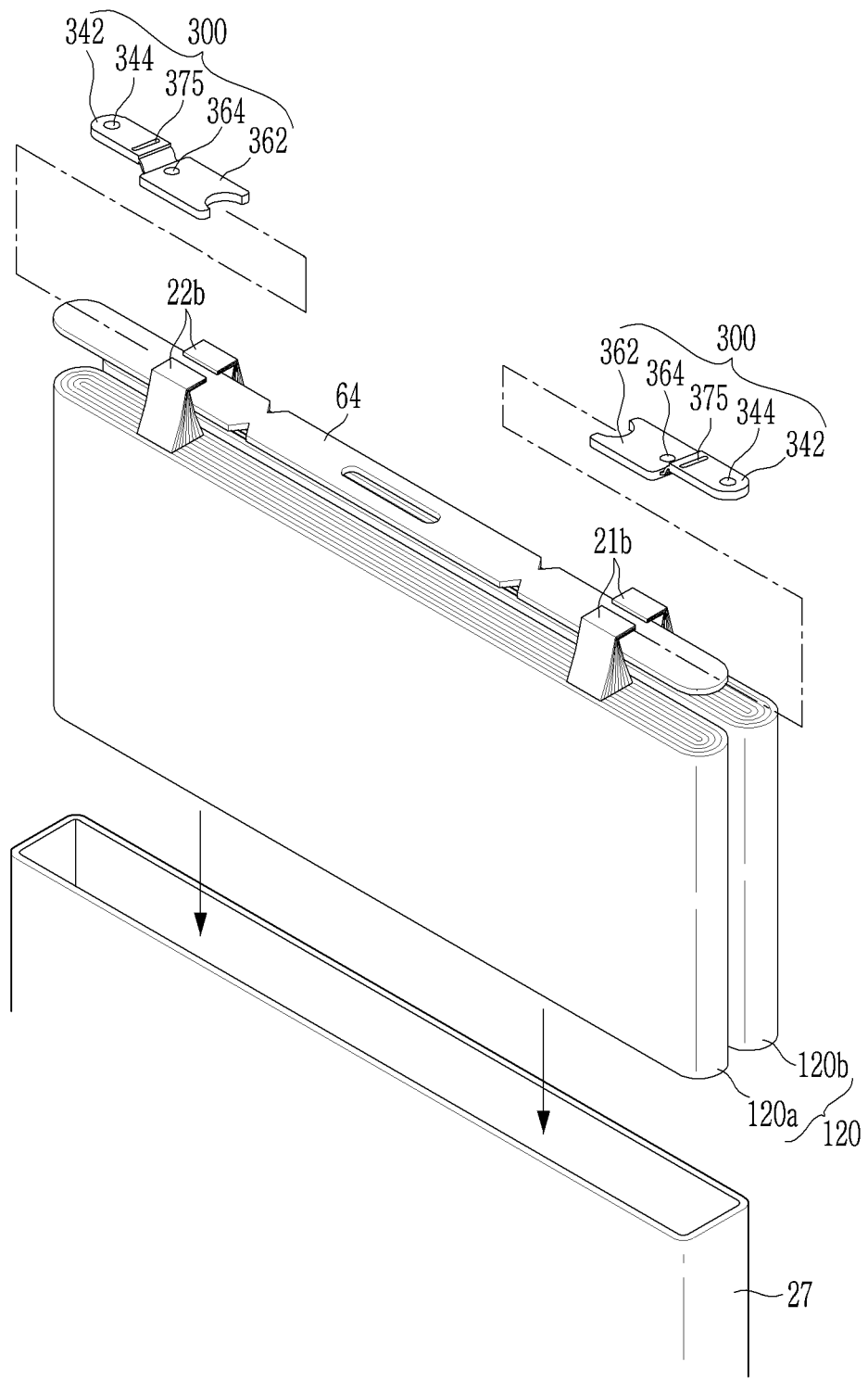
FIG. 3 illustrates a perspective view of a part of the rechargeable battery shown in FIG. 1.

As shown in FIG. 1 to FIG. 3, a rechargeable battery 101 according to an exemplary embodiment of the present invention includes an electrode assembly 120 wound by interposing a separator between a first electrode and a second electrode, a current collecting member 300 electrically connected to the electrode assembly 120, a case 27 in which the current collecting member 300 and the electrode assembly 120 are accommodated, and a cap assembly 30 combined to an opening of the case 27.

The rechargeable battery 101 will be exemplarily described as being a lithium ion rechargeable battery having a prismatic shape. However, the present invention is not limited thereto, and may be applicable to any of various types of batteries such as a lithium polymer battery, a cylindrical battery, and the like.

In an embodiment, the electrode assembly 120 may include a plurality of assemblies 120a and 120b, and each assembly 120a and 120b is spirally wound based on a winding axis in a state in which the separator is interposed between the first electrode and the second electrode and then may be pressed to be flat.

The first electrode and the second electrode include a coated region, which is a region in which an active material is coated on a thin plate formed of a metal foil, and uncoated regions 21b and 22b, which are regions in which the active material is not coated.

The first electrode coated region may be formed by coating a metal foil, such as one made of aluminum, with an active material such as a transition metal oxide and the like, and the second electrode coated region may be formed by coating a metal foil, such as one made of copper or nickel, with an active material such as graphite, carbon, or the like.

The first electrode uncoated region 21b and the second electrode uncoated region 22b may be respectively formed to protrude in the same direction toward the cap assembly 30 from one side of the first electrode coated region and one side of the second electrode coated region. The first electrode uncoated region 21b and the second electrode uncoated region 22b are cut to protrude from the metal foil, and may be respectively integrally formed with the metal foils of the first electrode coated region and the second electrode coated region.

The first electrode uncoated region 21b and the second electrode uncoated region 22b have different polarities, and are disposed to be spaced apart from each other.

In addition, since the first electrode and the second electrode are spiral-wound or overlapped, the first electrode uncoated region 21b and the second electrode uncoated region 22b may each be formed by overlapping a plurality of thin layers. As such, when the thin layers are formed to overlap each other, the thin layers may be connected to contact each other by ultrasonic welding to allow a current to easily flow.

The separator disposed between the first electrode coated region and the second electrode coated region may serve to prevent or substantially prevent a short circuit and to allow lithium ions to move, and may be made of, for example, polyethylene, polypropylene, or a composite film of polyethylene and polypropylene.

The electrode assembly 120 may be inserted into the case 27 in a direction parallel to the winding axis, and the electrode assembly 120 is substantially housed in the case 27 together with an electrolyte solution. The electrolyte solution may be composed of an organic solvent, such as EC, PC, DEC, and EMC, and a Li salt such as $LiPF_6$ and $LiBF_4$. The electrolyte solution may be in a liquid, solid, or gel state.

The electrode assembly 120 may include a first electrode assembly 120a and a second electrode assembly 120b, which will be described with reference to FIG. 3.

Figure 4:
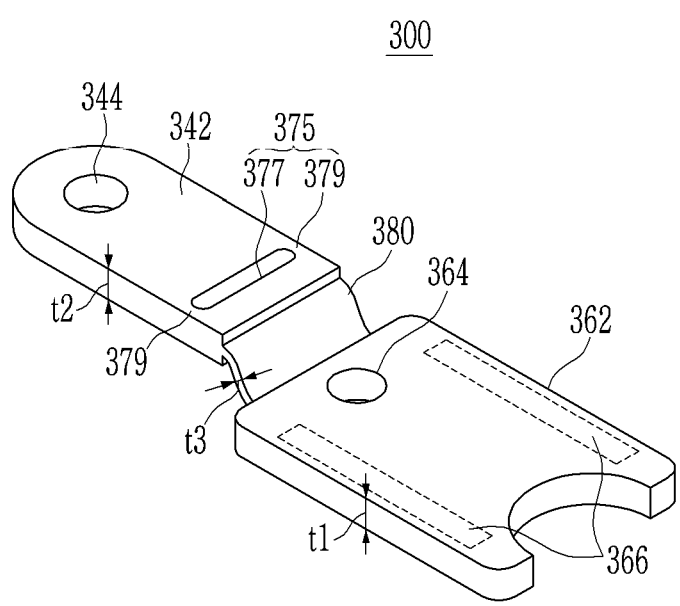
FIG. 4 illustrates a current collecting plate of a rechargeable battery according to an exemplary embodiment of the present invention.

FIG. 3 illustrates a partially exploded perspective view of the rechargeable battery of FIG. 1; and FIG. 4 illustrates a perspective view of a current collecting plate included in FIG. 3. In FIG. 3, a cap assembly is not illustrated for the sake of convenience.

As shown in FIG. 3, the first electrode assembly 120a and the second electrode assembly 120b included in the electrode assembly 120 may be electrically connected to each other.

The uncoated regions of the electrodes having the same polarity in the first electrode assembly 120a and the second electrode assembly 120b are electrically connected by a current collecting plate. That is, the first electrode uncoated region 21b of the first electrode assembly 120a and the first electrode uncoated region 21b of the second electrode assembly 120b are electrically connected by one of the current collecting plates 300, and the second electrode uncoated region 22b of the first electrode assembly 120a and the second electrode uncoated region 22b of the second electrode assembly 120b are electrically connected by another of the current collecting plates 300.

In this case, the first electrode uncoated region 21b of the first electrode assembly 120a and the first electrode uncoated region 21b of the second electrode assembly 120b may be bent in directions facing each other, and the second electrode uncoated region 22b of the first electrode assembly 120a and the second electrode uncoated region 22b of the second electrode assembly 120b may also be bent in directions facing each other.

A surface (e.g., a surface facing the cap assembly) of the current collecting plate 300 and a surface (e.g., a surface facing the electrode assembly) of the portion bent in the uncoated region contact each other to be electrically connected to each other.

Referring again to FIG. 1 and FIG. 2, in an embodiment, the case 27 is substantially cuboidal, and includes an opening at a surface thereof. The case 27 may be made of metal, such as aluminum or stainless steel.

The cap assembly 30 includes a cap plate 31 covering the opening of the case 27, a first terminal 50 protruding outside the cap plate 31 and electrically connected to the first electrode, and a second terminal 52 protruding outside the cap plate 31 and electrically connected to the second electrode.

The cap plate 31 has a plate shape extending in a direction, and is coupled to the opening of the case 27. In an embodiment, the cap plate 31 may be formed of a same material as the case 27, and may be coupled to the case 27 by laser welding. Therefore, the cap plate 31 may have the same polarity as that of the case 27.

The cap plate 31 is provided with an electrolyte injection hole 32 for injecting an electrolyte and a first connecting terminal hole 5 into which a connecting terminal 250 is inserted. A vent plate 39 formed with a notch 2 that may be opened at a certain pressure (e.g., a predetermined pressure) is provided in a vent hole 34. The electrolyte injection hole 32 is provided with a sealing cap 38, and the connecting terminal 250 is inserted into the first connecting terminal hole 5.

The first terminal 50 and the second terminal 52 may be provided on the cap plate 31. The first terminal 50 is electrically connected to the first electrode through one of the current collecting plates 300, and the second terminal 52 is electrically connected to the second electrode through another of the current collecting plates 300.

However, the present invention is not limited thereto, and the first terminal 50 may be electrically connected to the second electrode, while the second terminal 52 may be electrically connected to the first electrode.

In an embodiment, the first terminal 50 may have a rectangular plate shape. The first terminal 50 has a second connecting terminal hole 9 through which the connecting terminal is inserted and coupled, and is electrically connected to the first electrode through the connecting terminal 250.

The connecting terminal 250 may have a columnar shape, and an upper end thereof may be fixed to the first terminal 50 by being welded while being inserted into the second connecting terminal hole 9. In addition, a lower end of the connecting terminal 250 may be welded to the current collecting plate 300 in a state of being inserted into a coupling hole 344 of the current collecting plate 300, as described further later. Thus, the first electrode is electrically connected to the first terminal 50 through the current collecting plate 300 and the connecting terminal 250.

A sealing gasket 59 is provided in the first connecting terminal hole 5 to seal between the connecting terminal 250 and the cap plate 31.

The second terminal 52 is electrically connected to the second electrode through the connecting terminal 250 and the current collecting plate 300, the connecting terminal 250 being inserted in the first and second connecting terminal holes 5 and 9, as described above regarding the first terminal 50.

In an embodiment, a connecting member 58 is formed between the first terminal 50 and the cap plate 31, and a first insulating member 60 is formed between the second terminal 52 and the cap plate 31.

Thus, in an embodiment, the case 27 and the cap plate 31 are electrically connected to the first terminal 50 through the connecting member 58, and are charged with the same polarity as the first electrode, and the second terminal 52 is insulated from the cap plate 31 by the first insulating member 60.

A shorting protrusion 3 protruding toward a shorting hole 37 formed in the cap plate 31 is formed under the second terminal 52. The second terminal 52 is formed to extend in a direction so as to cover the shorting hole 37. Accordingly, the first insulating member 60 may be formed to be long along the second terminal 52 and to cover a lateral surface of the second terminal 52.

The shorting hole 37 of the cap plate 31 may be provided with a shorting member 56 connected to a lateral wall of the shorting hole 37 to short the first electrode and the second electrode.

In an embodiment, the shorting member 56 includes a curved portion that is curved with a convex arc shape toward the electrode assembly 120, and an edge portion fixed to the lateral wall of the shorting hole 37.

When gas is generated in the rechargeable battery due to an abnormal reaction, internal pressure of the rechargeable battery increases. When the internal pressure of the rechargeable battery becomes higher than a certain pressure (e.g., a predetermined pressure), the curved portion is made convex toward the second terminal 52 and directly contacts the shorting protrusion 3 of the second terminal 52 to cause a short circuit. When a short circuit occurs, no further cell reaction occurs and explosion due to the internal pressure increase may be prevented or substantially prevented.

A second insulating member 62 may be provided between the cap plate 31 and the current collecting plate 300, and an insulating plate 64 may be formed between the current collecting plate 300 and the electrode assembly 120.

In an embodiment, the second insulating member 62 may be integrally formed with an insulating case 130, and the electrode assembly 120 is surrounded by the insulating case 130.

The second insulating member 62 and the insulating plate 64 may serve as insulators and support the current collecting plate 300.

As shown in FIG. 2 to FIG. 4, in the rechargeable battery according to an exemplary embodiment of the present invention, the current collecting plate 300 is provided with a first flat plate portion 362 provided with a welded portion 366 to be welded to the uncoated regions 21b and 22b, and includes a second flat plate portion 342 electrically connected to a respective one of the electrode terminals 50 and 52 and provided with a fuse portion 375, and a vibration absorbing portion 380 of which opposite ends are respectively connected to the first flat plate portion 362 and the second flat plate portion 342 and facing in a longitudinal direction and having a thickness t3 which is thinner than the first flat plate portion 362 and the second flat plate portion 342.

The first flat plate portion 362 includes the welded portion 366 to be welded to the uncoated regions 21b and 22b of the electrode assembly 120. The uncoated regions 21b or 22b are the uncoated region 21b of the first electrode or the uncoated region 22b of the second electrode. That is, the first flat plate portion 362 is welded to the uncoated regions 21b or 22b at the welded portion 366, and is electrically connected to one of the electrodes of the electrode assembly 120.

The second flat plate portion 342 is connected to the first flat plate portion 362 through the vibration absorbing portion 380, and is electrically connected to the electrode terminals 50 or 52. For this purpose, the second flat plate portion 342 may be provided with the coupling hole 344 with which the connecting terminal 250 coupled with the first terminal 50 or the second terminal 52 is inserted into and coupled to.

The second flat plate portion 342 may include the fuse portion 375 in which a fuse 379 is formed, and may be provided to be parallel to the second flat plate portion 342. The fuse portion 375 may be provided as any of various types and shapes, and may include a fuse hole 377 and a pair of fuses 379 according to an exemplary embodiment of the present invention as described later.

The vibration absorbing portion 380 is connected to the first flat plate portion 362 and the second flat plate portion 342 that the opposite end portions thereof face in the longitudinal direction, and, as shown in FIG. 4, the vibration absorbing portion 380 has a thinner thickness t3 than a thickness t1 of the first flat plate portion 362 and a thickness t2 of the second flat plate portion 342. FIG. 3 and FIG. 4 show the current collecting plate 300 in which the first flat plate portion 362 and the second flat plate portion 342 are connected through the vibration absorbing portion 380.

The current collecting plate 300 includes the first flat plate portion 362 welded to the uncoated regions 21b and 22b through the welded portion 366, wherein vibration or shock tends to occur during a welding process or the like. Particularly, when ultrasonic welding or the like is performed between the uncoated regions 21b and 22b and the first flat plate portion 362, a vibration generation level may be considerably high.

During ultrasonic welding, vibration occurs at the current collecting plate to be welded, and, thus, the vibration may be transmitted to a second flat plate portion provided on the current collecting plate on which a first flat plate portion is provided.

A fuse portion of the current collecting plate serves to block an overcurrent from occurring, and is sensitive to vibration or shock due to a characteristic of the fuse in which a cross-sectional area thereof is reduced to increase a resistance value. That is, in the current collecting plate, the vibration or impact occurring during the welding process of the first flat plate portion may be easily transmitted to the second flat plate portion, and the fuse portion may be broken or damaged by the vibration or impact.

However, according to an exemplary embodiment of the present invention, while the vibration generated in the first flat plate portion 362 in which the ultrasonic welding or the like is performed is transmitted to the second flat plate portion 342, since the vibration absorbing portion 380 absorbs and reduces the vibration, the damage to the second flat plate portion 342 including the fuse portion 375 may be effectively prevented.

The vibration absorbing portion 380 is disposed between the first flat plate portion 362 and the second flat plate portion 342, and may be integrally formed with the first flat plate portion 362 and the second flat plate portion 342 as shown in FIG. 4, thereby forming the current collecting plate 300.

The vibration absorbing portion 380 is formed to be thinner than the first flat plate portion 362 and the second flat plate portion 342 such that the vibration generated in the first flat plate portion 362 is mainly transmitted to the vibration absorbing portion 380, and, thus, only remaining vibration other than the vibration absorbed by the vibration absorbing unit 380 is transmitted to the second flat plate portion 342, thereby minimizing or reducing damage to the second flat plate portion 342.

As shown in FIG. 4, the fuse portion 375 according to an exemplary embodiment of the present invention may include the fuse 379 having a smaller width than the width of the second flat plate portion 342.

In the present invention, the fuse portion 375 may be provided as any of various types and shapes, and, in an exemplary embodiment of the present invention, the fuse portion 375 shown in FIG. 4 is provided in the second flat plate unit 342 to have a narrower width than a neighboring region of the second flat plate unit 342.

A high density current flows in the fuse 379 having a narrow width on the same current path, and the fuse 379 has a large resistance value. Accordingly, a larger amount of heat is generated in the fuse 379 than in the surroundings, and the fuse 379 melts by the heat to block the current.

The fuse portion 375 may be more easily damaged by the vibration of the first flat plate portion 362 due to ultrasonic welding or the like. Therefore, according to the fuse portion 375 in which the fuse 379 is formed by reducing the width thereof as in the exemplary embodiment of the present invention, the vibration reducing effect in the second flat plate portion 342 by the vibration absorbing portion 380 advantageously increases.

That is, even if the fuse 379 having the narrow width is provided in the fuse portion 375 of the second flat plate portion 342, the vibration or impact that may be generated in the first flat plate portion 362 is minimized or reduced by the vibration absorbing portion 380, and then is applied to the second flat plate portion 342, and, thus, the damage of the fuse portion 375 may be minimized or reduced.

However, in the exemplary embodiment of the present invention, the vibration absorbing portion 380 having the thickness t3 that is smaller than the thicknesses t1 and t2 of the first flat plate portion 362 and the second flat plate portion 342 has a larger cross-sectional area than at least the fuse 379 to prevent it from melting before the fuse 379 when an overcurrent flows therein. That is, the thickness of the vibration absorbing portion 380 may be set such that the vibration absorbing portion 380 does not function as a fuse in relation to the fuse portion 375.

In an embodiment, the vibration absorbing portion 380 may have a curved extended shape as shown in FIG. 2 to FIG. 4. For example, the extended shape of the vibration absorbing part 380 can be variously shaped to be curved without being bent.

FIG. 4 shows a shape in which the vibration absorbing portion 380 is curved in a substantial "S" shape. A shape in which stress may be locally concentrated, such as a bent portion in the vibration absorbing portion 380, may cause damage or breakage of the vibration absorbing portion 380.

Therefore, according to an exemplary embodiment of the present invention, the vibration absorbing portion 380 is extended to be curved, and, thus, it is possible to prevent the vibration absorbing portion 380 from being broken when the stress is concentrated thereon, and, furthermore, it is advantageous to increase a vibration width in the vibration absorbing portion 380, such that the amount of vibration transmitted from the first flat plate portion 362 to the second flat plate portion 342 may be greatly reduced.

In an exemplary embodiment of the present invention, the first flat plate portion 362 of the current collecting plate 300 is ultrasonically welded to the uncoated regions 21b and 22b of the electrode assembly 120 at the welded portion 366, and the first flat plate portion 362 is provided with a jig hole 364 for ultrasonic welding.

The ultrasonic welding may be advantageous for welding an object that is thin and easily damaged, such as the electrode assembly 120. As described above, when the uncoated regions 21b and 22b of the electrode assembly 120 and the current collecting plate 300 are welded by ultrasonic welding, since the welded portion 366 is vibrated, the amount of vibration transmitted to the second flat plate portion 342 is very large, such that the vibration absorbing portion 380 according to an exemplary embodiment of the present invention is advantageously operated.

When the ultrasonic welding is performed, an object to be welded must be fixed. For this purpose, the jig hole 364 is provided in the first flat plate portion 362 in an exemplary embodiment of the invention.

FIG. 4 shows the first flat plate portion 362 provided with the jig hole 364. When the ultrasonic welding is performed, the first flat plate portion 362 may be fixed through the jig hole 364, and then the ultrasonic welding may be performed.

As shown in FIG. 2 or FIG. 3, the first flat plate portion 362 and the second flat plate portion 342 are formed in a longitudinal direction parallel to the cap assembly 30, and may be disposed to have different heights with respect to the electrode assembly 120.

In an embodiment, the first flat plate portion 362 is welded to the uncoated regions 21b and 22b of the electrode assembly 120 through the welded portion 366, and the second flat plate portion 342 is coupled to the connecting terminal 250 connected to the electrode terminals 50 and 52. Here, the electrode terminals 50 and 52 may be the first terminal 50 and the second terminal 52.

In addition, a space may be formed between the electrode assembly 120 and the cap assembly 30 provided with the electrode terminals 50 and 52, and in the current collecting plate 300 according to an exemplary embodiment of the present invention, the first flat plate portion 362 and the second flat plate portion 342 have different heights in consideration of the positional relationship between the cap assembly 30 and the electrode assembly 120 spaced apart from each other.

That is, the first flat plate portion 362 is disposed close to the electrode assembly 120, and the second flat plate portion 342 is disposed close to the cap assembly 30, and, thus, the first flat plate portion 362 and the second flat plate portion 342 may be easily electrically connected to the uncoated regions 21b and 22b and the electrode terminals 50 and 52, respectively, such that it is advantageous for space disposition or space utilization.

Referring to FIG. 2, the first flat plate portion 362 of the current collecting plate 300 is disposed to correspond to an upper height of the electrode assembly 120, and the second flat plate portion 342 is disposed to be higher than the first flat plate portion 362 based on a bottom surface of the case 27 to be closer to the electrode terminals 50 and 52.

Referring to FIG. 3, a plurality of the electrode assemblies 120 are provided according to an exemplary embodiment of the invention, which include the first electrode assembly 120a and the second electrode assembly 120b, and a pair of the welded portions 366 of the first flat plate portions 362 are provided, which are welded to the uncoated regions 21b and 22b of the first electrode assembly 120a and the second electrode assembly 120b, respectively.

The electrode assembly 120 may be stacked such that the lateral surfaces face each other, and the uncoated regions 21b and 22b of the first electrode or the second electrode in the first electrode assembly 120a and the second electrode assembly 120b are welded to the same current collecting plate 300.

In an embodiment, a pair of the welded portions 366 of the current collecting plate 300 are provided such that the uncoated regions 21b and 22b of the same electrode are welded to a single current collecting plate 300 in the first electrode assembly 120a and the second electrode assembly 120b, and the pair of welded portions 366 may be welded to the uncoated regions 21b and 22b of another electrode assembly 120.

In addition, in an exemplary embodiment of the present invention, the vibration absorbing portion 380 is provided with a width corresponding to that of the second flat plate portion 342, the first flat plate portion 362 is provided with a wider width than that of the vibration absorbing portion 380, and opposite end portions of the vibration absorbing portion 380 may protrude from the vibration absorbing portion 380 to form a pair of welded portions 366.

That is, in an exemplary embodiment of the present invention, the width of the first flat plate portion 362 is larger than the widths of the vibration absorbing portion 380 and the second flat plate portion 342, and both of the opposite end portions of the first flat plate portion 362 protrude in a width direction from the vibration absorbing portion 380 to form the welded portions 366.

Since the welded portion 366 is a portion at which a welding process is directly performed, amounts of heat and vibration are the largest, and the thickness t3 of the vibration absorbing portion 380 is smaller than that of the first flat plate portion 362, such that the vibration absorbing portion 380 having low mechanical rigidity may be damaged by the heat or the like. Accordingly, in an exemplary embodiment, the first flat plate portion 362 has a wider width than the vibration absorbing portion 380, thereby forming a distance between the welded portions 366 of the opposite end portions and the vibration absorbing portion 380.

Accordingly, even if the ultrasonic welding or the like is performed in the welded portion 366, the vibration absorbing portion 380 separated from the welded portion 366 may be protected from damage of the heat due to the welding.

As shown in FIG. 2, in an embodiment, the first electrode assembly 120a and the second electrode assembly 120b are formed in a wound shape, and are stacked such that their lateral surfaces face each other. The uncoated regions 21b and 22b are disposed to face the cap assembly 30. The current collecting plate 300 is disposed between the uncoated regions 21b and 22b and the cap assembly 30, and may be welded to the uncoated regions 21b and 22b of the first and second electrode assemblies 120a and 120b such that the welded portions 366 of the pair face each other.

As described above, since the current collecting plate 300 is disposed between the pair of electrode assemblies 120a and 120b and the cap assembly 30, it is possible to easily electrically connect the electrode assemblies 120a and 120b and the electrode terminals 50 and 52.

FIG. 3 shows the insulating plate 64 disposed between the electrode assembly 120 and the cap assembly 30 and between the uncoated regions 21b and 22b of the first electrode assembly 120a and the second electrode assembly 120b. An internal short circuit may be prevented or substantially prevented by the insulating plate 64.

FIG. 3 shows a structure in which the first flat plate portion 362 of the current collecting plate 300 is disposed between bent portions of the uncoated regions 21b and 22b and the insulating plate 64 as an exemplary embodiment of the present invention.

The second insulating member 62 is disposed on the bent portions of the uncoated regions 21b and 22b to be insulated from the cap assembly 30.

That is, in the exemplary embodiment of the present invention, the insulating plate 64, the first flat plate portion 362, and the uncoated regions 21b and 22b may be sequentially stacked on the upper end of the electrode assembly 120, and the first flat plate portion 362 and the uncoated regions 21b and 22b supported by the insulating plate 64 are welded through the welded portion 366.

While the present invention has been described in connection with what are presently considered to be some practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly comprising an electrode comprising an uncoated region;
a case configured to accommodate the electrode assembly and comprising an opening;
a cap assembly comprising an electrode terminal and configured to be coupled to the opening to seal the case; and
a current collecting plate configured to be coupled to the uncoated region of the electrode assembly,
wherein the current collecting plate comprises:
a first flat plate portion comprising a welded portion welded to the uncoated region,
a second flat plate portion comprising a fuse portion and electrically connected to the electrode terminal, and
a vibration absorbing portion connected to the first and second flat plate portions of which opposite end portions face each other in a longitudinal direction of the cap assembly, the vibration absorbing portion having a thickness that is thinner than thicknesses of the first and second flat plate portions, and
wherein the uncoated region is welded to an upper surface of the first flat plate portion, and a side surface of the first flat plate portion is directly connected to the vibration absorbing portion.

2. The rechargeable battery of claim 1, wherein the fuse portion comprises a fuse having a width that is narrower than a width of the first flat plate portion.

3. The rechargeable battery of claim 1, wherein the vibration absorbing portion extends having a curved shape along the longitudinal direction between the first flat plate portion and the second flat plate portion.

4. The rechargeable battery of claim 3, wherein the welded portion is ultrasonically welded to the uncoated region, and the first flat plate portion comprises a jig hole for ultrasonic welding.

5. The rechargeable battery of claim 3, wherein the first flat plate portion and the second flat plate portion are arranged in the longitudinal direction parallel to the cap assembly, and are arranged to have different heights with respect to the electrode assembly.

6. The rechargeable battery of claim 1, wherein
the electrode assembly comprises a plurality of electrode assemblies including a first electrode assembly and a second electrode assembly, and
the welded portion comprises a pair of welded portions to be welded to corresponding uncoated regions of the first and second electrode assemblies.

7. The rechargeable battery of claim 6, wherein
the vibration absorbing portion has a width corresponding to a width of the second flat plate portion, and
the first flat plate portion has a width that is wider than the width of the vibration absorbing portion, and opposite end portions of the first flat plate portion protrude outward in a width direction relative to the vibration absorbing portion to form the pair of welded portions.

8. The rechargeable battery of claim 6, wherein
the first electrode assembly and the second electrode assembly have a wound shape and are stacked with their lateral surfaces facing each other, the uncoated region being directed to the cap assembly, and
the current collecting plate is between the uncoated region and the cap assembly and is welded to the respective uncoated regions of the first electrode assembly and the second electrode assembly that the pair of welded portions respectively face.

9. The rechargeable battery of claim 8, further comprising an insulating plate arranged between the uncoated regions of the first electrode assembly and the second electrode assembly in a width direction and between the electrode assembly and the current collecting plate in a height direction.

\* \* \* \* \*